(12) United States Patent
Cann

(10) Patent No.: US 9,925,968 B2
(45) Date of Patent: Mar. 27, 2018

(54) BRAKE BOOSTER ASSEMBLY

(71) Applicant: BeijingWest Industries Co., Ltd., Beijing (CN)

(72) Inventor: Barton Cann, South Lyon, MI (US)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 8 days.

(21) Appl. No.: 15/070,030

(22) Filed: Mar. 15, 2016

(65) Prior Publication Data

US 2016/0339890 A1    Nov. 24, 2016

Related U.S. Application Data

(60) Provisional application No. 62/162,993, filed on May 18, 2015.

(51) Int. Cl.
*B60T 13/74* (2006.01)

(52) U.S. Cl.
CPC .................. *B60T 13/745* (2013.01)

(58) Field of Classification Search
CPC ...... B60T 13/745; B60T 13/746; B60T 7/042; B60T 7/04; B60T 13/74
USPC .................. 60/545, 594, 585, 551, 552, 553
See application file for complete search history.

(56) References Cited

U.S. PATENT DOCUMENTS

| | | | |
|---|---|---|---|
| 4,395,883 A * | 8/1983 | Melinat ................... | B60T 7/042 60/545 |
| 8,069,662 B1 * | 12/2011 | Albert ..................... | B60T 7/107 60/545 |
| 2003/0070885 A1 | 4/2003 | Tachiiri et al. | |

(Continued)

FOREIGN PATENT DOCUMENTS

| CN | 2923453 Y | 7/2007 |
|---|---|---|
| CN | 102039885 A | 5/2011 |
| CN | 201882069 U | 6/2011 |

(Continued)

OTHER PUBLICATIONS

Japanese Office Action No. 2016-096303 dated Mar. 14, 2017, Three (3) Pages (includes English Translation, Three (3)Pages).

(Continued)

*Primary Examiner* — Melanie Torres Williams
(74) *Attorney, Agent, or Firm* — William H. Honaker; Dickinson Wright PLLC

(57) ABSTRACT

A brake booster assembly is provided. The assembly includes a rack including a plurality of rack teeth extending therefrom and moveable and extending along a first axis. A sensor is coupled with the rack for sensing force and axial displacement of the rack and outputting a signal proportional to the sensed force and the sensed displacement. A planetary gear subassembly is disposed about a second axis transverse to the first axis and is coupled with the rack for moving the rack along the first axis in response to rotation of the planetary gear subassembly about the second axis. A pair of motors are coupled to the planetary gear subassembly for rotating the planetary gear subassembly and moving the rack along the first axis. A controller is electrically connected to the sensor and to the motors for controlling rotation of the planetary gear subassembly in response to the signal from the sensor.

18 Claims, 5 Drawing Sheets

(56) References Cited

U.S. PATENT DOCUMENTS

2012/0192556 A1* 8/2012 Verhagen ................. B60T 8/38
                                                                       60/585
2016/0121869 A1* 5/2016 Cann .................... B60T 13/746
                                                                       188/156

FOREIGN PATENT DOCUMENTS

| CN | 103231706 A | 8/2013 |
| CN | 103802813 A | 5/2014 |
| JP | 2003097612 A | 4/2003 |
| JP | 2010524754 | 7/2010 |
| JP | 201193472 | 5/2011 |
| KR | 10-2012-0034757 | 4/2012 |

OTHER PUBLICATIONS

Korean Office Action No. 10-2016-0058983 dated Sep. 12, 2017, Nine (9) Pages (includes English Translation, Nine (9) Pages).
First Office Action issued from corresponding Chinese Patent Application No. 20160228436.5 dated Jan. 12, 2018 (6 Pages).
Search Report from State Intellectual Property Office of People's Republic of China dated Dec. 29, 2017 (4 Pages).

\* cited by examiner

BRAKE BOOSTER ASSEMBLY

CROSS REFERENCE TO RELATED APPLICATION

This application claims the benefit of U.S. Provisional Application No. 62/162,993 filed May 18, 2015, which is incorporated herein by reference in its entirety.

BACKGROUND OF THE INVENTION

1. Field of the Invention

A brake booster assembly for providing an assistive force in a braking system.

2. Description of the Prior Art

Brake booster assemblies of the type to which the subject invention pertains generally provide an assist to the force input to the master cylinder beyond that provided by a driver's effort in pushing the brake pedal. Typically, brake booster assemblies attach to a brake pedal and to a master cylinder. Many brake booster assemblies use a hollow housing and at least one diaphragm to create pressure chambers within the housing. The pressure chambers are connected to a vacuum source (e.g. an engine intake) using control valves. The diaphragm is coupled with a piston in the master cylinder and the vacuum pressure provides an assistive force to the force input to the master cylinder as the brake pedal is pressed.

Emissions requirements, smaller engines, and supercharging can greatly reduce vacuum pressure that may be available to a brake booster assembly, so vacuum pumps may also be used. Additionally, hybrid and completely electric vehicles may not provide constant vacuum pressure. Conventional booster assemblies can also increase the weight of vehicles due to their complexity and use of large components. Accordingly, there remains a significant need for a solution providing an assistive force in a braking system with fewer parts and which may be used on vehicles with little or no available vacuum pressure.

SUMMARY AND ADVANTAGES OF THE INVENTION

The invention provides for such a brake booster assembly including a rack moveable along a first axis. At least one sensor is coupled with the rack for sensing force and axial displacement of the rack and outputting a signal proportional to the sensed force and the sensed displacement. A planetary gear subassembly is disposed about a second axis transverse to the first axis and coupled with the rack for moving the rack along the first axis in response to rotation of the planetary gear subassembly about the second axis. A first motor is coupled to the planetary gear subassembly for rotating the planetary gear subassembly about the second axis to move the rack along the first axis. A second motor is also coupled to the planetary gear subassembly for rotating the planetary gear subassembly about the second axis to move the rack along the first axis. A controller is electrically connected to the at least one sensor and to the first motor and the second motor for controlling rotation of the planetary gear subassembly and axial movement of the rack in response to the signal from the at least one sensor.

The invention also provides for a brake booster assembly including a rack moveable along a first axis and at least one sensor coupled with the rack for sensing force and axial displacement of the rack and outputting a signal proportional to the sensed force and the sensed displacement. A planetary gear subassembly is disposed about a second axis transverse to the first axis and coupled with the rack for moving the rack along the first axis in response to rotation of the planetary gear subassembly about the second axis. At least one motor is coupled to the planetary gear subassembly for rotating the planetary gear subassembly about the second axis to move the rack along the first axis. A clutch subassembly is disposed adjacent the rack and coupled between the planetary gear subassembly and the rack for selectively transferring torque from the planetary gear subassembly to move the rack. A controller is electrically connected to the at least one sensor and the at least one motor for controlling rotation of the planetary gear subassembly in response to the signal from the at least one sensor.

Additionally, the invention provides for a method of operating a brake booster assembly including the steps depressing a brake pedal and moving and applying a force to a rack in response to movement of the brake pedal. The method continues by sensing displacement and force corresponding to the movement of the rack with a sensor and outputting a signal proportional to the sensed displacement and force with the sensor. Next, selectively driving a first motor and a second motor in response to the signal from the sensor. The next step of the method is rotating a planetary gear subassembly coupled to the rack with the first motor and the second motor. The method concludes by moving the rack axially in response to rotation of the planetary gear subassembly.

Thus, several advantages of one or more aspects of the brake booster assembly are that it may be used for vehicles with smaller engines, diesel engines, supercharged engines, as well as with hybrid or electric vehicles. The brake booster assembly also reduces overall vehicle weight since it may be used in place of considerably larger and more complex vacuum pressure based brake boosters. Forces applied to a brake pedal attached to the brake booster assembly are still applied to the master cylinder if there is a loss of electrical power unlike "brake-by-wire" systems. Moreover, the brake booster assembly may be back driven (i.e. retracted) without power.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a brake booster assembly 20 is generally shown for providing an assist to the input force to a brake master cylinder 22 beyond that provided by a driver's effort in pressing a brake pedal 24. Although the preferred embodiment of the invention is intended to be used for ground vehicles, it should be appreciated that the disclosed brake booster assembly 20 may be used for many other applications such as, but not limited to use in other brake systems or where it is desired to boost or assist a rectilinear force input to a system.

Figure 1:
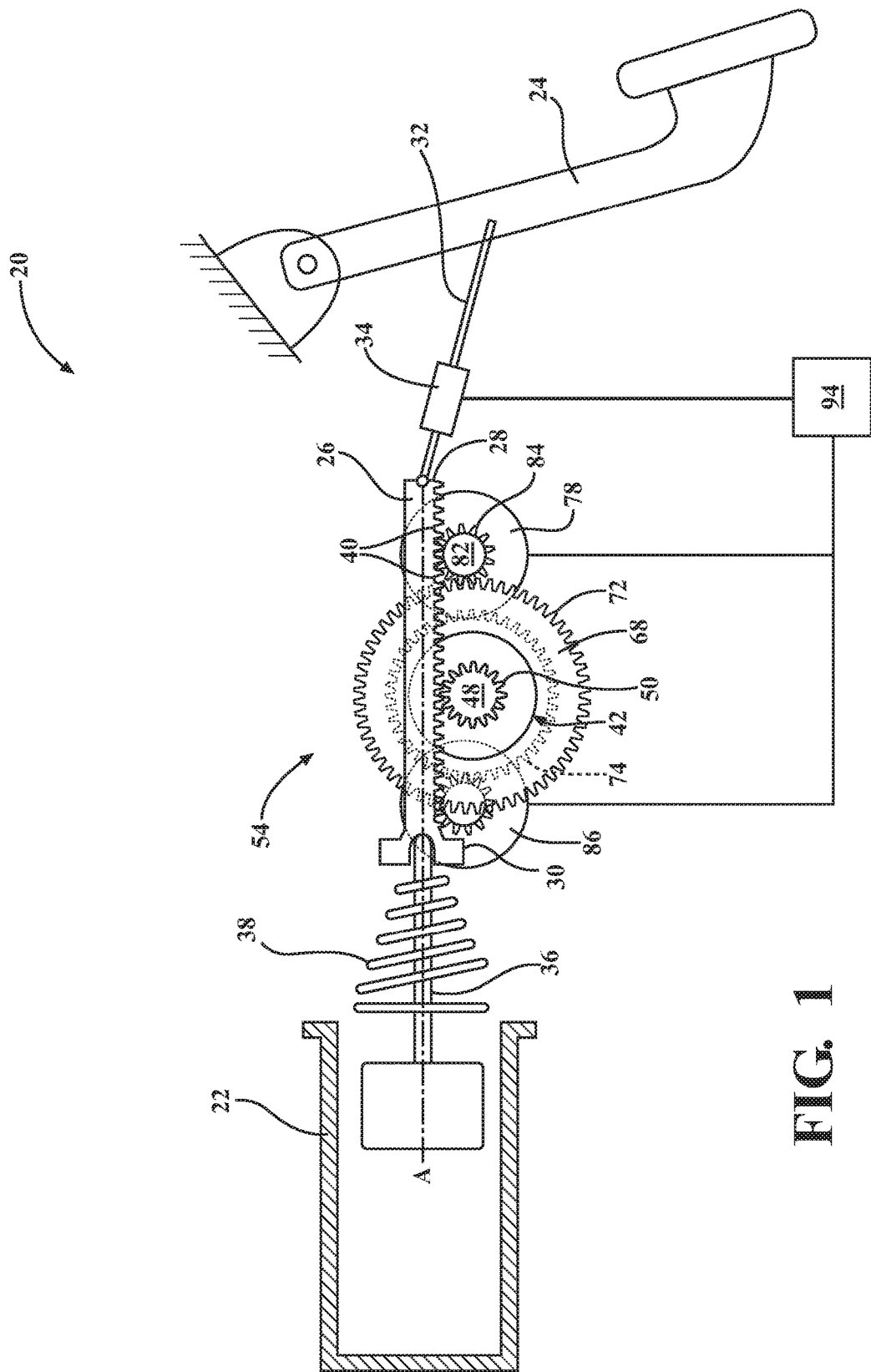
FIG. 1 is a perspective view of a brake booster assembly.

As best shown in FIG. 1, the brake booster assembly 20 includes a rack 26 moveable and extending along a first axis A. The rack 26 includes a first end 28 and a second end 30 and an external surface. A pedal linkage 32 is attached to and extends axially from the first end 28 of the rack 26 for connection to the brake pedal 24. At least one sensor 34 is attached to the pedal linkage 32 for sensing force and axial displacement of the pedal linkage 32 and outputting a signal proportional to the sensed force and the sensed displacement. Although the sensor 34 of the preferred embodiment senses changes in displacement and force or strain, it should be appreciated that the brake booster assembly 20 may be configured to include or use other sensors 34 or sense various other associated mechanical or electrical characteristics while operating. A push rod 36 is attached to and extends axially from the second end 30 of the rack 26 for engaging the master cylinder 22. A return spring 38 is annularly disposed about the push rod 36 and extends axially between the master cylinder 22 and the second end 30 of the rack 26 for applying a force against the rack 26 toward the pedal linkage 32 (i.e. resists movement of the rack 26 toward the master cylinder 22). The rack 26 includes a plurality of rack teeth 40 extending radially from the external surface and disposed along the rack 26. While the preferred embodiment includes a pedal linkage 32, push rod 36, and return spring 38, other embodiments may not include all of these elements. For example, the rack 26 could directly engage the master cylinder 22 and the rack 26 could be directly attached to the brake pedal 24 so that no pedal linkage 32 or push rod 36 is necessary.

Figure 2:
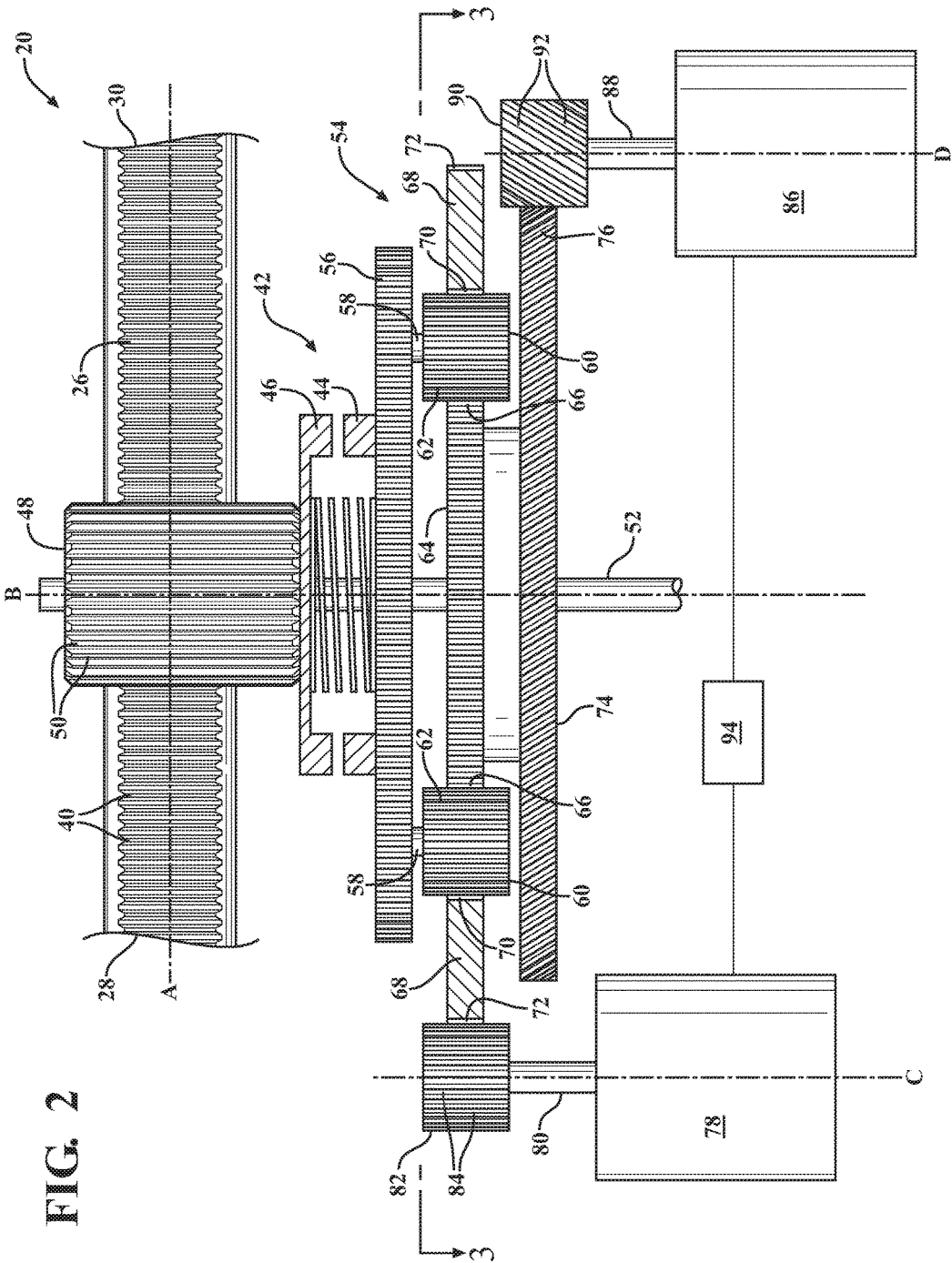
FIG. 2 is a top view of the brake booster assembly constructed in accordance with a preferred embodiment of the invention and illustrating a planetary gear subassembly.

As illustrated by FIG. 2, a clutch subassembly 42, generally indicated, is disposed adjacent the rack 26 and includes a drum 44 and a hub 46. The drum 44 is disposed about and extends along and radially from a second axis B transverse to the first axis A and is rotatable about the second axis B. The hub 46 is disposed about and extends along and radially from the second axis B adjacent the drum 44 and is rotatable about the second axis B for selectively engaging the drum 44 and transferring torque from the drum 44 to the hub 46. Although the preferred embodiment includes a clutch subassembly 42, it should be appreciated that the brake booster assembly 20 could also be operated without a clutch subassembly 42. In other words, the clutch subassembly 42 is optional. Additionally, it should be understood that the clutch subassembly 42 may be selected from any type of clutch, such as, but not limited to centrifugal, multiple plate, or magneto-rheological types.

A sleeve 48 having a generally cylindrical shape and an exterior and defining a bore disposed centrally and extending through the sleeve 48 along the second axis B is coupled with the hub 46. The exterior of the sleeve 48 defines a plurality of sleeve teeth 50 extending radially from the exterior. The sleeve teeth 50 meshingly engage the rack teeth 40 for moving the rack 26 along the first axis A in response to rotation of the hub 46 and the sleeve 48 about the second axis B. A main shaft 52 extends through the clutch subassembly 42 and the sleeve 48 along the second axis B.

Figure 3:
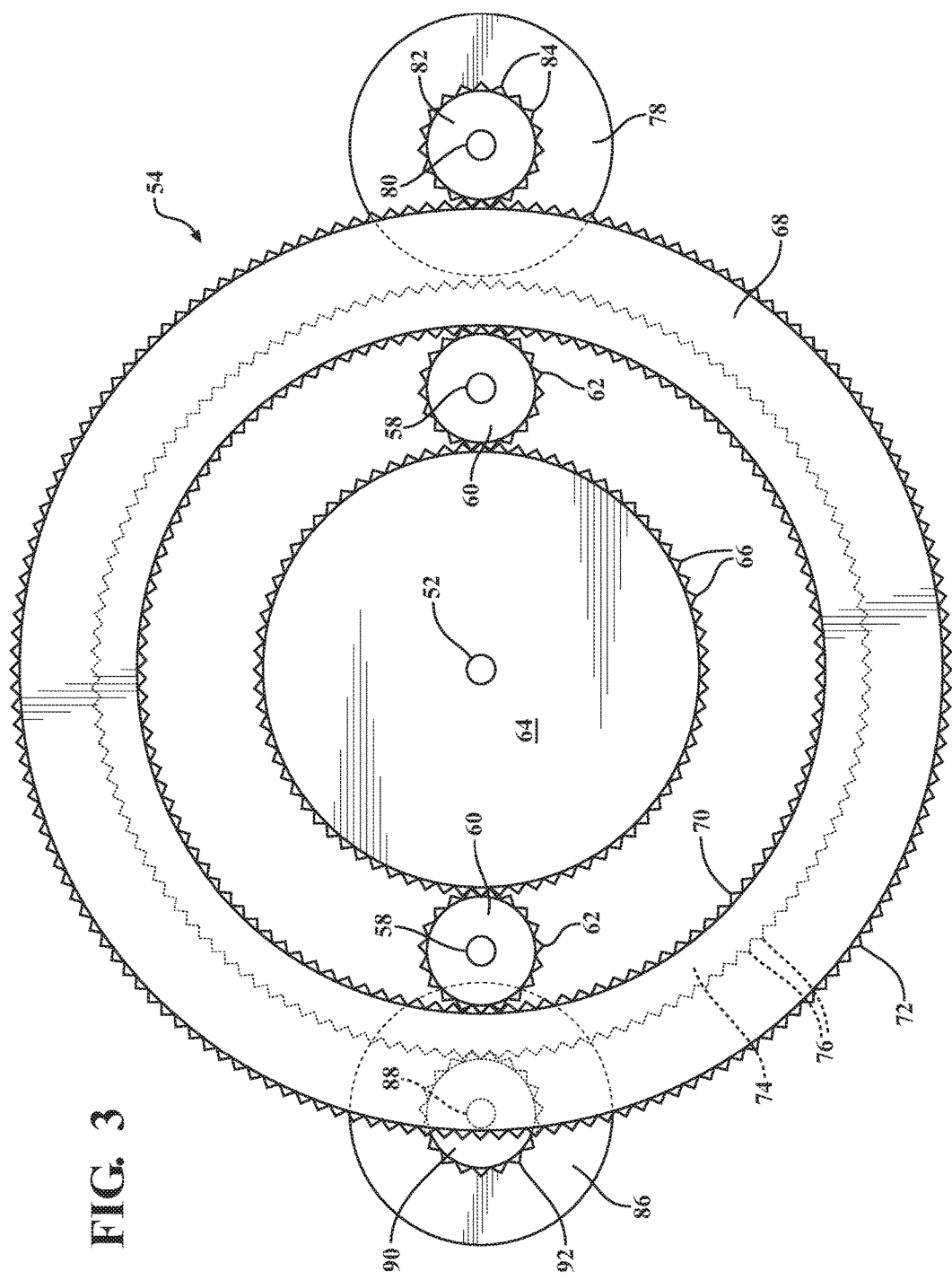
FIG. 3 is a side view of the planetary gear subassembly of the brake booster assembly of FIG. 2.

A planetary gear subassembly 54, generally indicated, is disposed about the second axis B and is coupled with the drum 44 of the clutch subassembly 42 for rotating the sleeve 48 and moving the rack 26 along the first axis A in response to rotation of the clutch subassembly 42 and the planetary gear subassembly 54 about the second axis B. The planetary gear subassembly 54 includes a planetary carrier 56 slidably disposed on the main shaft 52 adjacent and attached to the drum 44 and rotatable about and extending along and radially from the second axis B. The planetary carrier 56 includes a pair of planet shafts 58 that extend in parallel to the second axis B. A plurality of planet gears 60 (FIG. 3) attach to and rotate about the planet shafts 58. In the preferred embodiment, a pair of planet gears 60 are utilized, however, it should be understood that the planetary gear subassembly 54 could instead include a greater or fewer number of planet gears 60. The planet gears 60 each have a plurality of planet teeth 62 extending radially therefrom. The planetary gear subassembly 54 also includes a sun gear 64 having a plurality of sun teeth 66 (FIGS. 2 and 3) extending radially therefrom. The sun gear 64 is slidably disposed on the main shaft 52 and is rotatable about the second axis B. The planetary gear subassembly 54 additionally includes a ring gear 68 annularly disposed about the planet gears 60. The ring gear 68 has a plurality of inner ring teeth 70 (FIGS. 2 and 3) extending radially inwardly therefrom and a plurality of outer ring teeth 72 extending radially outwardly therefrom. The ring gear 68 is rotatable about the second axis B. The inner ring teeth 70 of the ring gear 68 meshingly engage the planet teeth 62 for moving the planet gears 60 in response to the ring gear 68 rotating about the second axis B. The planetary gear subassembly 54 further includes a drive gear 74 having a plurality of drive teeth 76 extending radially therefrom. The drive gear 74 is coupled with the sun gear 64 and is slidably disposed on the main shaft 52 for rotatably driving the sun gear 64 about the second axis B.

A first motor 78 is disposed adjacent the ring gear 68 and has a first axle 80 rotatable about and extending along a third axis C generally parallel to the second axis B. Although the third axis C is generally parallel to the second axis B in the preferred embodiment, it should be appreciated that other configurations of the first motor 78, drum 44, hub 46, sleeve 48, and rack 26 may be alternatively used. A first pinion gear 82 is attached to the first axle 80 of the first motor 78 and has a plurality of first pinion teeth 84 meshingly engaging the outer ring teeth 72 for rotating the ring gear 68 about the second axis B in response to the first axle 80 and the first pinion gear 82 rotating about the third axis C.

A second motor 86 is disposed adjacent the drive gear 74 and has a second axle 88 rotatable about and extending along a fourth axis D generally parallel to the second axis B. A second pinion gear 90 is attached to the second axle 88 of the second motor 86 and has a plurality of second pinion teeth 92 meshed with the drive teeth 76 for rotating the drive gear 74 and the sun gear 64 about the second axis B in response to the second axle 88 and the second pinion gear 90 rotating about the fourth axis D. While the fourth axis D is generally parallel to the second axis B in the preferred embodiment, it should be appreciated that other configurations of the second motor 86, drum 44, hub 46, sleeve 48, and rack 26 may be alternatively used. For example, the second pinion gear 90 could instead be a worm gear, so that the second motor 86 and fourth axis D are arranged generally parallel to the first axis A.

As described above, the preferred embodiment includes the drive gear 74 coupled with the sun gear 64 and driven by the second motor 86, however, it should be appreciated that the planetary gear subassembly 54 could be configured in other ways such as, but not limited to driving the planetary carrier 56 and coupling the sun gear 64 to the drum 44 in order to achieve a different gear ratio than that resulting from the configuration of the preferred embodiment. Similarly, it should be understood that although the preferred embodiment utilizes two motors 78, 86, the brake booster assembly 20 could instead be operated with only the first motor 78, only the second motor 86, or with more than two motors 78, 86. It should also be appreciated that sun gear 64, ring gear 68, planet gears 60, drive gear 74, and pinion gears 82, 90 may be resized or configured to include a greater or fewer number of teeth gearing to provide the appropriate amount of movement of the rack 26 as a result of movement of the axles 80, 88 of the motors 78, 86. Additionally, any one of the sun gear 64, ring gear 68, or planet gears 60 could be grounded or configured to be stationary to obtain additional gear ratios of the planetary gear subassembly 54.

A controller 94 is electrically connected to the sensor 34 (FIG. 1) and to the first motor 78 and to the second motor 86 for controlling rotation of the first axle 80 of the first motor 78 and for controlling rotation of the second axle 88 of the second motor 86 in response to the signal from the sensor 34. The controller 94 may also be configured to control the clutch subassembly 42. In one embodiment, one or both motors 78, 86 could be driven at an optimum speed and then the controller 94 can control the clutch subassembly 42 as needed to move the rack 26.

Existing electric boosters may use an electric motor in conjunction with a gear drive without the use of a clutch to allow the booster to hold a displacement position. However, because of the nature of some gear drives, this configuration is generally difficult to back-drive (i.e. retract) without power. To retract when the driver's foot is lifted from the brake pedal 24, high-rate compression springs may be added to these boosters. In addition to the back drive force provided by the spring, the electric motor may still need to be driven in reverse to allow worm drive rotation in the opposite direction each time retraction of the push rod 36 is necessary. Accordingly, such configurations may lead to braking difficulties in the event that no electrical power is available to the booster.

Because of the direct mechanical coupling from the brake pedal 24 through the rack 26, to the push rod 36, embodiments of the brake booster assembly 20 described herein will continue to function without electrical power. Under conditions when the motors 78, 86 are not energized or if the brake booster assembly 20 loses electrical power, the brake booster assembly 20 can still operate as a "non-boosted" manual brake system and force applied through the brake pedal 24 will still be applied to the master cylinder 22. The clutch subassembly 42 of the preferred embodiment decouples the rack 26 from the planetary gear subassembly 54 during brake release or power-off operation, allowing the push rod 36 to retract under less force. Therefore, the brake booster assembly 20 functions without electrical power in a similar fashion to the function of brake vacuum pressure based boosters when there is a loss of vacuum pressure. Consequently, the brake booster assembly 20 has an advantage over purely "brake-by-wire" systems by meeting existing vehicle safety standards requirements which dictate fail-safe operation.

The controller 94 of the brake booster assembly 20 constantly detects and interprets the signal from the sensor 34 (e.g. force, and/or displacement, and/or strain) and provides individual voltage and current output to each of the motors 78, 86 which, in turn drive opposite sides of the planetary gear subassembly 54 to provide the appropriate amount of boost, or rate of boost to the master cylinder 22 and to the braking system of the vehicle. By controlling each of the motors 78, 86 at a specific speed or revolutions per minute (RPM) and direction, the speed (i.e. RPM) of the output of the planetary gear subassembly 54 may be held to zero. Therefore, the push rod 36 is held at a specific and constant displacement, under power.

When the driver releases the brake pedal 24, partially or completely, the clutch subassembly 42 and motors 78, 86 may be controlled to allow the retraction of the push rod 36 due to the force of the return spring 38. However, the clutch subassembly 42 and motors 78, 86 may also be controlled to actively assist the retraction of the push rod 36 from the master cylinder 22. In other words the direction of the motors 78, 86 may be reversed and torque transferred through the gears 60, 64, 68, 74, 82, 90 to actively move the rack 26 away from the master cylinder 22 and toward the pedal linkage 32.

The brake booster assembly 20 as disclosed is able to react and provide boost or brake assist in fractions of a second. Because of this, the brake booster assembly 20 could be used to apply varying pressure pulses to the master cylinder 22 and to the rest of the brake system in much the same way that Anti-lock Braking Systems (ABS) delivers pressure pulses to the brakes at each wheel. These pressure pulses could be achieved by using the controller 94 of the brake booster assembly 20 to switch the electrical power to the motors 78, 86 at a high rate (e.g. period of approximately 20 ms) or by rapidly engaging and disengaging the clutch subassembly 42. Therefore, the brake booster assembly 20 could be used to reduce the weight of a braking system by taking the place of brake system components generally used for ABS such as, but not limited to an ABS pump.

Additionally, the brake booster assembly 20 can provide brake actuation without driver input through the brake pedal 24. Thus, the brake booster assembly 20 could be coupled with other systems already existing in a vehicle such as, but not limited to object proximity systems (e.g. Active Cruise Control), theft detection systems, parking brake, or "Hill-hold" features. These systems generally actuate the braking system without driver input, so the brake booster assembly 20 may be used to assist the operation of or replace components of these systems.

Figure 4:
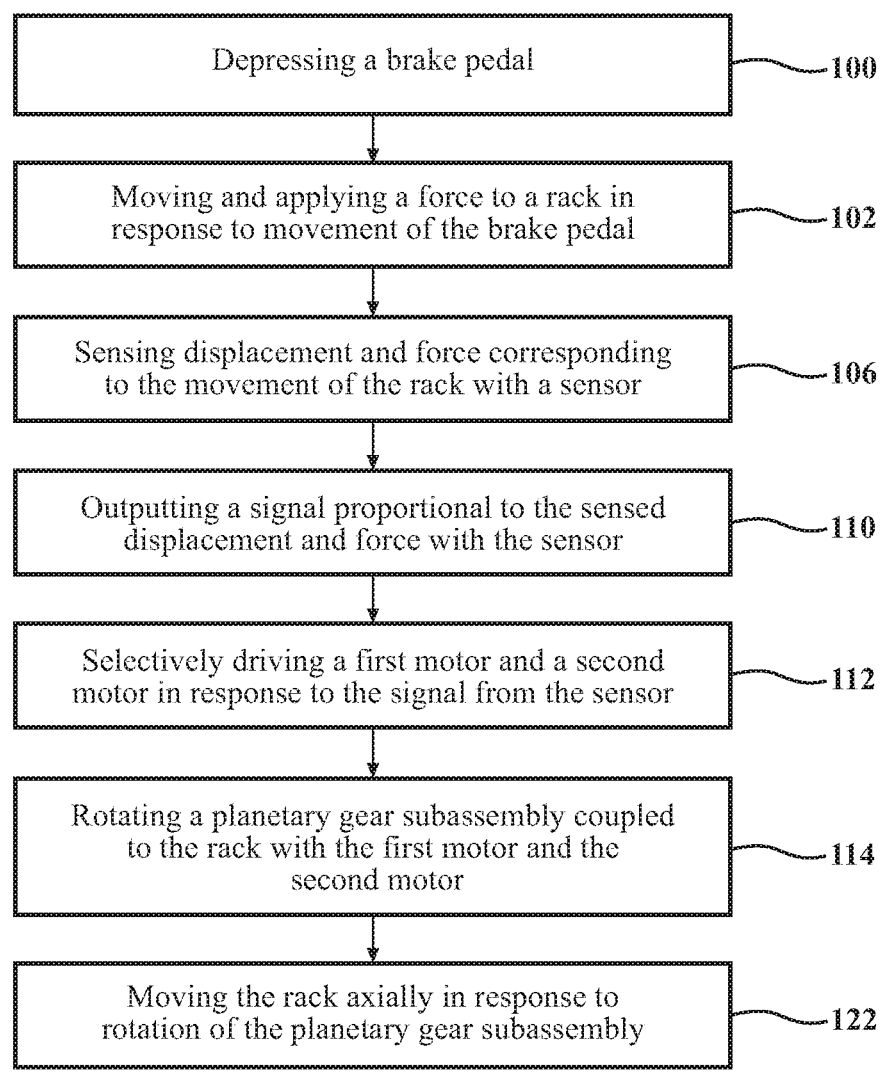
FIG. 4 is a flow chart illustrating steps of operating an embodiment of the brake booster assembly.
Figure 5:
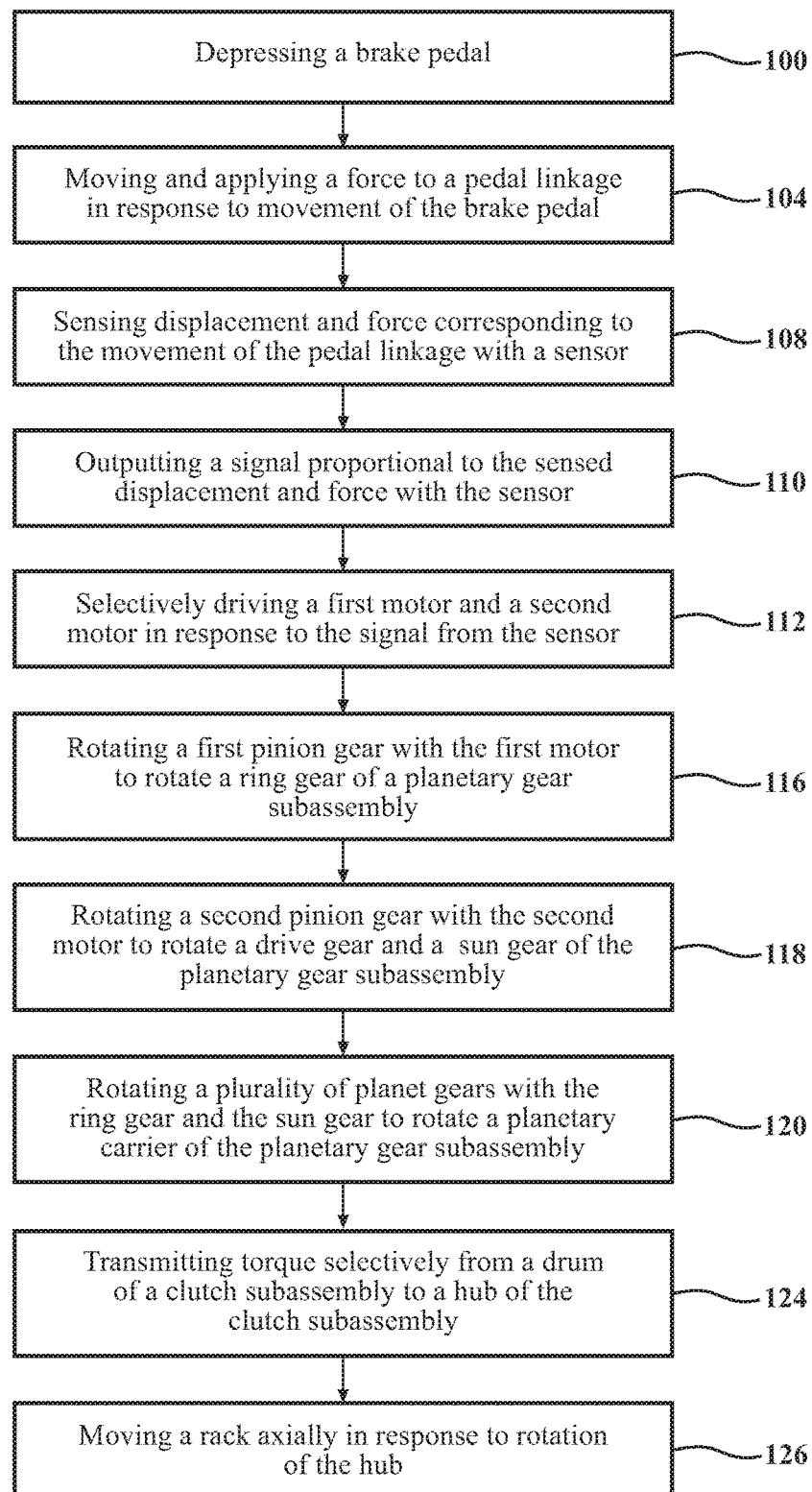
FIG. 5 is an additional flow chart illustrating steps of operating an embodiment of the brake booster assembly.

A method of operating a brake booster assembly 20 is also disclosed. Referring to FIGS. 4 and 5, the method includes the steps of 100 depressing the brake pedal 24 and 102 moving and applying a force to the rack 26 in response to movement of the brake pedal 24. More specifically 104 moving and applying a force to the pedal linkage 32 in response to movement of the brake pedal 24. The method progresses by 106 sensing displacement and force from the movement of the rack 26 with the sensor 34. Because the sensor 34 may actually be attached to the pedal linkage 32, this step may be further defined as 108 sensing displacement and force from the movement of the pedal linkage 32 with the sensor 34. The next step is 110 outputting a signal proportional to the sensed displacement and force with the sensor 34. Next, 112 selectively driving the first motor 78 and the second motor 86 in response to the signal from the sensor 34 and 114 rotating the planetary gear subassembly 54 coupled to the rack 26 with the first motor 78 and the second motor 86. Particularly, the step of 114 rotating the planetary gear subassembly 54 coupled to the rack 26 with the first motor 78 and the second motor 86 can include 116 rotating a first pinion gear 82 with the first motor 78 to rotate a ring gear 68 of the planetary gear subassembly 54 and 118 rotating a second pinion gear 90 with the second motor 86 to rotate a drive gear 74 and a sun gear 64 of the planetary gear subassembly 54. The step of 114 rotating the planetary gear subassembly 54 coupled to the rack 26 with the first motor 78 and the second motor 86 can also include 120 rotating a plurality of planet gears 60 with the ring gear 68 and the sun gear 64 to rotate a planetary carrier 56 of the planetary gear subassembly 54. The method continues by 122 moving the rack 26 axially in response to rotation of the planetary gear subassembly 54. Specifically, the step of 122 moving the rack 26 axially in response to rotation of the planetary gear subassembly 54 may include 124 transmitting torque selectively from the drum 44 of the clutch subassembly 42 to the hub 46 of the clutch subassembly 42 and 126 moving the rack 26 (and push rod 36) axially in response to rotation of the hub 46.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A brake booster assembly comprising:
a rack moveable along a first axis,
at least one sensor coupled with said rack for sensing force and axial displacement of said rack and outputting a signal proportional to the sensed force and the sensed displacement,
a planetary gear subassembly disposed about a second axis transverse to said first axis and coupled with said rack for moving said rack along said first axis in response to rotation of said planetary gear subassembly about said second axis,
a first motor coupled to said planetary gear subassembly for rotating said planetary gear subassembly about said second axis to move said rack along said first axis,
a second motor coupled to said planetary gear subassembly for rotating said planetary gear subassembly about said second axis to move said rack along said first axis, and
a controller electrically connected to said at least one sensor and to said first motor and said second motor for controlling rotation of said planetary gear subassembly and axial movement of said rack in response to the signal from said at least one sensor,
wherein said planetary gear subassembly includes a planetary carrier coupled to said rack and rotatable about said second axis and a plurality of planet gears are rotatably coupled to said planetary carrier and a sun gear engages said planet gears and rotates about said second axis and a ring gear annularly disposed about and engages said planet gears and rotates about said second axis and a drive gear couples to said sun gear for rotatably driving said sun gear.

2. A brake booster assembly as set forth in claim 1 wherein said rack includes a plurality of rack teeth extending therefrom and said assembly further including a sleeve coupled to said planetary carrier of said planetary gear subassembly and having an exterior defining a plurality of sleeve teeth meshingly engaging said rack teeth for moving said rack along said first axis in response to rotation of said planetary carrier.

3. A brake booster assembly as set forth in claim 2 further including a first pinion gear coupled to and driven by said first motor and engaging said ring gear of said planetary gear subassembly and a second pinion gear coupled to and driven by said second motor and engaging said drive gear of said planetary gear subassembly for rotating each of said sun gear and said ring gear about said second axis.

4. A brake booster assembly as set forth in claim 3 wherein said first motor includes a first axle attached to said first pinion gear and rotatable about a third axis generally parallel to said second axis and said second motor includes a second axle attached to said second pinion gear and rotatable about a fourth axis generally parallel to said second axis.

5. A brake booster as set forth in claim 3 wherein said ring gear has a plurality of inner ring teeth extending radially inwardly therefrom and a plurality of outer ring teeth extending radially outwardly therefrom and said sun gear includes a plurality of sun teeth extending radially therefrom and said plurality of planet gears include planet teeth meshingly engaging said inner ring teeth and said sun teeth and said first pinion gear has a plurality of first pinion teeth meshingly engaging said outer ring teeth and said second pinion gear has a plurality of second pinion teeth and said drive gear includes a plurality of drive teeth meshingly engaging said second pinion teeth.

6. A brake booster assembly as set forth in claim 1 wherein said plurality of planet gears is a pair of planet gears.

7. A brake booster assembly as set forth in claim 1 further including a main shaft extending through said planetary gear subassembly along said second axis.

8. A brake booster assembly comprising:
a rack moveable along a first axis,
at least one sensor coupled with said rack for sensing force and axial displacement of said rack and outputting a signal proportional to the sensed force and the sensed displacement,
a planetary gear subassembly disposed about a second axis transverse to said first axis and coupled with said rack for moving said rack along said first axis in response to rotation of said planetary gear subassembly about said second axis,
at least one motor coupled to said planetary gear subassembly for rotating said planetary gear subassembly about said second axis to move said rack along said first axis,
a clutch subassembly disposed adjacent said rack and coupled between said planetary gear subassembly and said rack for selectively transferring torque from said planetary gear subassembly to move said rack, and
a controller electrically connected to said at least one sensor and said at least one motor for controlling rotation of said planetary gear subassembly in response to the signal from said at least one sensor.

9. A brake booster assembly as set forth in claim 8 wherein said rack includes a plurality of rack teeth extending therefrom and said brake booster assembly further including a sleeve coupled to said clutch subassembly and having an exterior defining a plurality of sleeve teeth meshingly engaging said rack teeth for moving said rack along said first axis in response to rotation of said planetary gear subassembly.

10. A brake booster assembly as set forth in claim 9 wherein said clutch subassembly includes a drum disposed about and extending along and radially from said second axis and coupled to said planetary gear subassembly and a hub disposed about and extending along and radially from said second axis and coupled to said sleeve for selectively engaging said drum and transferring torque from said drum to said hub.

11. A brake booster assembly as set forth in claim 10 wherein said planetary gear subassembly includes a planetary carrier coupled to said drum of said clutch subassembly and rotatable about said second axis and a plurality of planet gears are rotatably coupled to said planetary carrier and a sun gear engages said planet gears and rotates about said second axis and a ring gear annularly disposed about and engages said planet gears and rotates about said second axis and a drive gear couples to said sun gear for rotatably driving said sun gear.

12. A brake booster assembly as set forth in claim 11 wherein said at least one motor includes a first motor and a second motor and said brake booster assembly further including a first pinion gear coupled to and driven by said first motor and engaging said ring gear of said planetary gear subassembly and a second pinion gear coupled to and driven by said second motor and engaging said drive gear of said planetary gear subassembly for rotating each of said sun gear and said ring gear about said second axis.

13. A brake booster assembly as set forth in claim 12 wherein said first motor includes a first axle attached to said first pinion gear and rotatable about a third axis generally parallel to said second axis and said second motor includes a second axle attached to said second pinion gear and rotatable about a fourth axis generally parallel to said second axis.

14. A brake booster as set forth in claim 12 wherein said ring gear has a plurality of inner ring teeth extending radially inwardly therefrom and a plurality of outer ring teeth extending radially outwardly therefrom and said sun gear includes a plurality of sun teeth extending radially therefrom and said plurality of planet gears include planet teeth meshingly engaging said inner ring teeth and said sun teeth and said first pinion gear has a plurality of first pinion teeth meshingly engaging said outer ring teeth and said second pinion gear has a plurality of second pinion teeth and said drive gear includes a plurality of drive teeth meshingly engaging said second pinion teeth.

15. A method of operating a brake booster assembly comprising the steps of:
   depressing a brake pedal,
   moving and applying a force to a rack in response to movement of the brake pedal,
   sensing displacement and force corresponding to the movement of the rack with a sensor,
   outputting a signal proportional to the sensed displacement and force with the sensor,
   selectively driving a first motor and a second motor in response to the signal from the sensor,
   rotating a planetary gear subassembly coupled to the rack with the first motor and the second motor, and
   moving the rack axially in response to rotation of the planetary gear subassembly,
   wherein the step of rotating a planetary gear subassembly coupled to the rack with the first motor and the second motor includes rotating a first pinion gear with the first motor to rotate a ring gear of the planetary gear subassembly and rotating a second pinion gear with the second motor to rotate a drive gear and a sun gear of the planetary gear subassembly.

16. A method as set forth in claim 15 further including the step of rotating a plurality of planet gears with the ring gear and the sun gear to rotate a planetary carrier of the planetary gear subassembly.

17. A method as set forth in claim 15 wherein the step of moving a rack axially in response to rotation of the planetary gear subassembly includes transmitting torque selectively from a drum of a clutch subassembly to a hub of the clutch subassembly and moving the rack axially in response to rotation of the hub.

18. A method as set forth in claim 15 wherein the step of moving and applying a force to a rack in response to movement of the brake pedal includes moving and applying a force to a pedal linkage in response to movement of the brake pedal and wherein the step of sensing displacement and force corresponding to the movement of the rack with a sensor includes sensing displacement and force corresponding to the movement of the pedal linkage with the sensor.

* * * * *